July 19, 1932.　　　　A. PENN　　　　1,867,756
ROOM THERMOSTAT
Filed Feb. 24, 1930　　　2 Sheets-Sheet 1
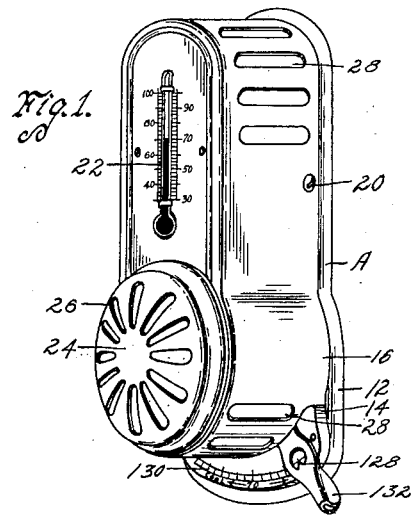
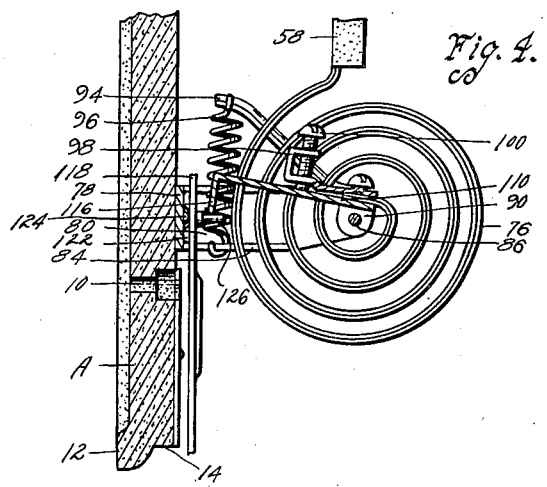
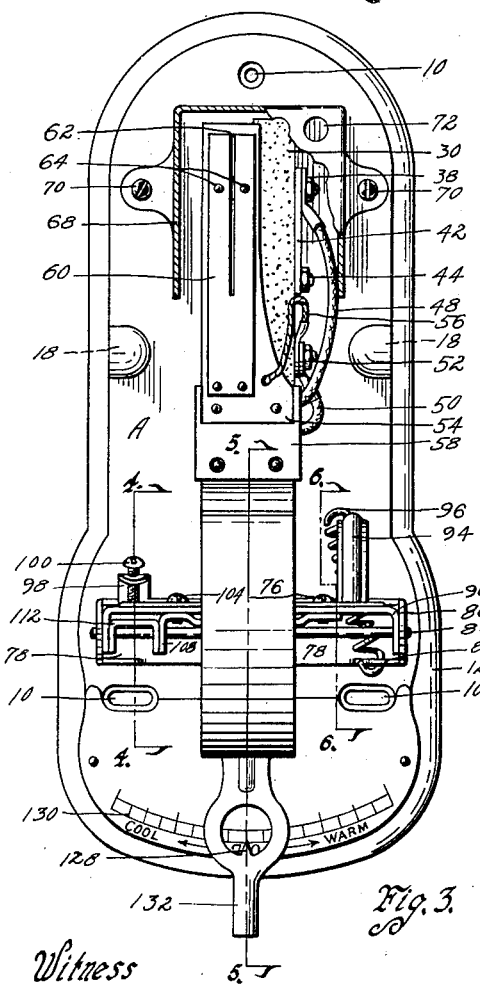
Witness
H. S. Munzenmaier
Inventor
~ Albert Penn ~
by Bair, Freeman & Sinclair
Attorneys

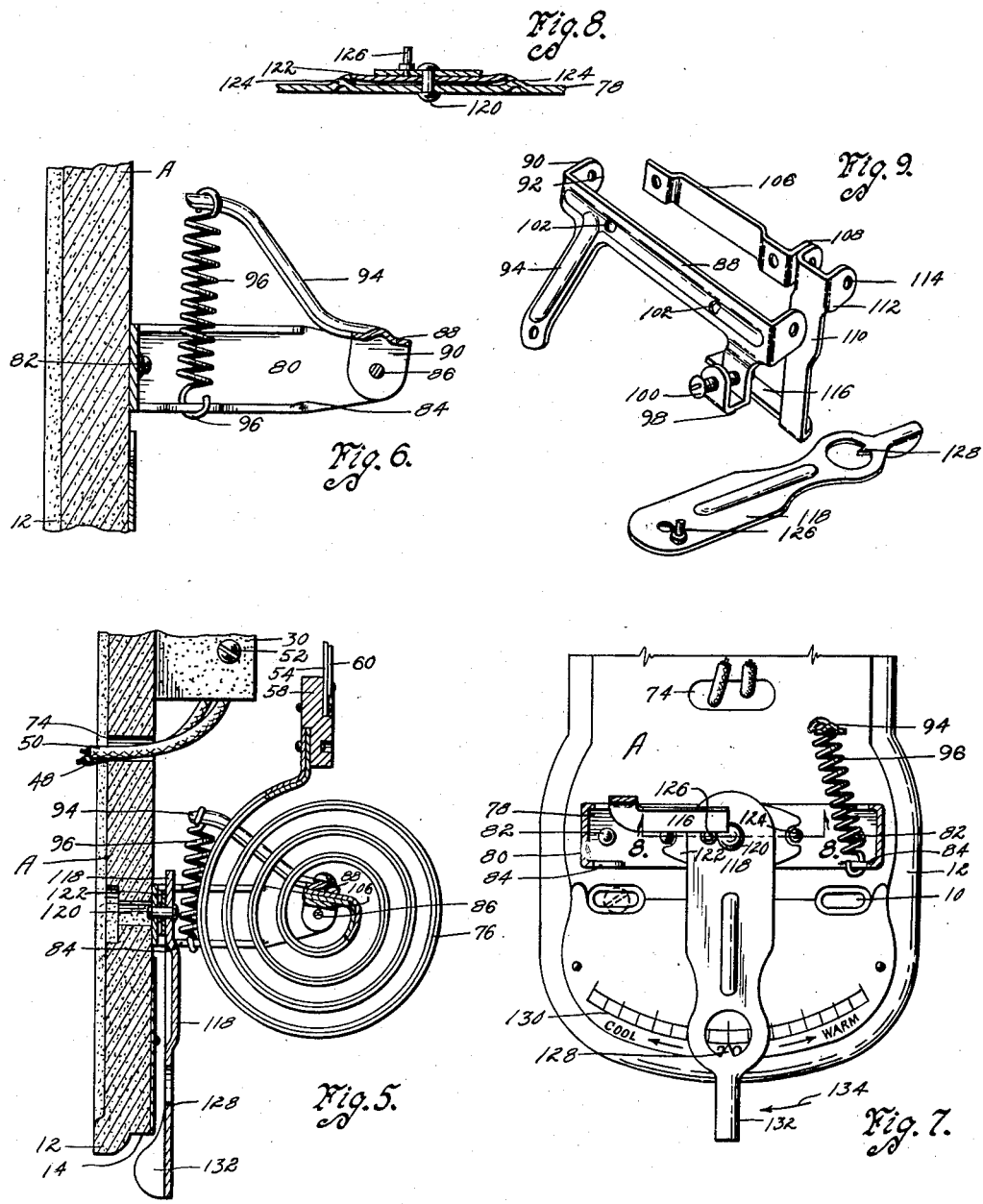

Patented July 19, 1932

1,867,756

UNITED STATES PATENT OFFICE

ALBERT PENN, OF DES MOINES, IOWA, ASSIGNOR TO PENN ELECTRIC SWITCH CO., OF DES MOINES, IOWA, A CORPORATION OF IOWA

ROOM THERMOSTAT

Application filed February 24, 1930. Serial No. 430,492.

The object of my invention is to provide a room thermostat or temperature control switch of simple, durable and comparatively inexpensive construction.

A further object is to provide a room thermostat operable for making and breaking an electric circuit controlled by a thermostatic metal bar mounted in such position as will permit a control device to move it, whereby the circuit will be made or broken at different room temperatures.

Another object is to provide a mounting for one end of the thermostatic metal bar having means of slight rotary or pivotal movement, and a spring for constraining the mounting towards one direction of movement and a control device for limiting such pivotal movement, the control device, however, being operable for varying the position of the mounting against the action of the spring.

Still a further object is to provide a mounting for one end of a thermostatic metal bar and a control device for moving the mounting, the control device being independent of and not connected to the mounting but associated therewith, whereby movement of the control device will impart movement to the mounting.

Still another object is to provide a thermostatic metal bar operable for making and breaking an electric circuit, and a control device for varying the time of such operation, said control device being not directly connected to the thermostatic bar, and a spring for yieldingly holding the thermostatic bar in operative relation to said control device.

Still a further object is to provide a mounting for the thermostatic metal bar, which can be easily assembled and initially adjusted for proper operation of the room thermostat.

For common subject matter this case is a continuation in part of my co-pending application, Serial No. 260,796, filed March 10, 1928.

With these and other objects in view, my invention consists in the construction, arrangement and combination of the various parts of my device, whereby the objects contemplated are attained, as hereinafter more fully set forth, pointed out in my claims, and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings, in which:

Figure 1 is a perspective view of my room thermostat.

Figure 2 is a central, vertical, sectional view through the center thereof.

Figure 3 is a front plan view of the room thermostat with the cover removed therefrom.

Figure 4 is a sectional view taken on the line 4—4 of Figure 3.

Figure 5 is a vertical, sectional view taken on the line 5—5 of Figure 3.

Figure 6 is a vertical, sectional view taken on the line 6—6 of Figure 3.

Figure 7 is a transverse, sectional view taken on the line 7—7 of Figure 2.

Figure 8 is a detail, sectional view taken on the line 8—8 of Figure 7; and

Figure 9 is a perspective view of the thermostatic bar mounting means with the parts in disassembled spaced position.

In the accompanying drawings, I have used the reference character A to indicate generally a support or base formed of non-conducting material.

The base A includes a plurality of openings 10 through which may be extended screws or the like for mounting the base upon a wall surface. Some of the openings 10 are elongated so as to permit slight adjustment in the mounting of the device.

The base A is so formed as to provide a peripheral flange 12 with a shoulder 14. A cover 16 is adapted to extend over the base and to receive the shoulder 14.

The base is of a molded character and includes a pair of openings 18 in its sides adjacent the shoulder 14. The openings 18 are screw-threaded to receive screws or the like 20. The screws 20 extend through the sides of the cover 16 as clearly illustrated in Figure 1.

Upon the face of the cover 16, I provide a temperature indicator 22. Below the temperature indicator 22 upon the face of the cover, I provide an out-pressed sheet metal portion 24 provided with a plurality of openings 26. The side walls of the cover 16 likewise are provided with a plurality of openings 28 for permitting atmosphere to pass through the cover 16 for affecting operation of the thermostatic metal bar, as will be hereinafter more fully set forth.

Molded upon the base A is an upstanding support 30. Secured to one side of the support 30 is a permanent magnet 32.

The magnet 32 has an insulated sheet 34 resting thereagainst and over which I place a metallic plate 36. A bolt or the like 38 extends through the plate 36, the insulated sheet 34 between the magnet 32, and through the support 30. The plate 36 has a pair of contact points 40, which may be termed stationary auxiliary contacts.

The base A is recessed so that a portion of the magnet 32 may extend therein as shown by dotted lines in Figure 2 of the drawings.

Along one side of the support 30 opposite from the magnet 32, I mount a short bar 42, which has the bolt 38 passing therethrough. A second bolt 44 passes through the bar 42 and also through the support 30. The bolt 44 carries an adjustable stationary main contact 46.

A lead wire 48 is connected to the bolt 38 and forms one side of the electric circuit. A second lead wire 50 is connected to a post or bolt 52 upon the support 30. In order to complete the circuit, I provide an armature arm 54 having an electric connection with the lead wire 50 through the flexible wire 56. The wire 56 is of sufficient length to permit the armature arm to swing or move as will hereinafter be described. The armature arm 54 is riveted or otherwise secured to an insulated bar 58.

Mounted upon the armature arm 54 is a spring metal bar 60 bifurcated at one end as at 62. A pair of movable auxiliary contact points 64 are carried by the bifurcated portion of the spring bar 60 and are adapted to coact with the contact points 40 carried by the plate 36.

The armature arm on its under side carries a contact point 66, which is adapted to contact with the stationary contact 46 for supplying an additional path for the current when the circuit is made.

The purpose of dividing the auxiliary contacts 40 and 64 and the mounting of the movable contacts 64 upon the spring bar 60 is to permit partial movement of the armature arm before the contacts are actually broken.

The details of construction of the contact members together with the magnet construction and armature arm are completely shown and described in my co-pending application, Serial No. 260,796, and therefore form no part of my present invention except in the general combination.

I provide a housing 68 which is secured to the base A by screws or the like 70. The housing 68 is formed with a plurality of openings 72. The housing 68 serves as a protection against any possible contingency of the electric connections coming in contact with the housing or cover device.

The two lead wires 48 and 50 extend through an opening 74 in the base A.

In order to move the armature arm for making and breaking the electric circuit for starting or stopping an electric motor controlled by my room thermostat, I provide a thermostatic metal bar 76 in coil form. The thermostatic bar 76 is mounted for slight rotary or pivotal movement.

One end of the bar 76 is connected to the insulated piece 58, whereby the armature arm 54 is insulated from the thermostatic bar 74.

I will now describe the mounting for the thermostatic bar and its control device.

Upon the base A, I mount a bracket 78 having a pair of upstanding arms 80. The bracket is secured to the base A by means of screws or the like 82. The arms 80 are formed with flanges 84 whereby the parts are reinforced. A pintle rod 86 is carried by the arms 80 and extends therebetween.

Mounted upon the pintle rod 86 is a bracket 88 having a pair of ears 90 provided with openings 92 which receive the pintle rod 86. An extension 94 is formed upon the bracket 88. One end of a coil spring 96 is connected to the lower end of the extension 94 and has its other end connected to one of the flanges 84 on the arms 80.

The bracket 88 includes a channel-shaped portion 98 having an adjusting screw 100 carried thereby, as clearly illustrated in Figure 9 of the drawings. A pair of openings 102 are provided in the bracket 88, through which screws 104 may extend. A locking bar 106 is adapted to have the ends of the screws 104 secured thereto.

One end of the thermostatic bar 76 is received between the bracket 88 and the locking bar 106. One end of the locking bar 106 is provided with an out-turned extension 108, which has an opening therein, through which the pintle rod 86 extends.

Pivotally mounted on the pintle rod 86 is a movable element 110 having a downward extension adapted to coact with the adjusting screw 100. A pair of arms or extensions 112 are formed upon the movable element 110, each having openings 114 therein through which the pintle rod 86 passes.

The lower end of the movable element 110 is provided with a lateral extension 116. The extension 116 is adapted to coact with the control device, as will hereinafter more fully be set forth.

My control device consists of an arm 118 pivotally secured to the cross piece of the bracket 78 by means of a rivet or the like 120. A spring washer-like device 122 is interposed between the cross piece of the bracket 78 and the under surface of the arm 118 adjacent the rivet 120.

The spring washer-like device 122 is held from rotary movement by means of up-struck buttons 124 on the bracket 78 which fit into notches formed in the member 122.

The arm 118 includes an upstanding pin 126 which is adapted to coact with and engage one edge of the lateral extension 116. The arm 118 projects beyond the lower end of the base A, and includes a pointer 128, which is positioned adjacent indicating characters 130 mounted upon the base.

The lower end of the arm 18 is rebent upon itself as at 132 for providing a finger engaging portion.

It will be noted that there is no direct and positive connection between the control device and the movable element 110. The spring 96 tends, however, to force the movable element 110 and the lateral extension 116 thereof into engagement with the pin 126 of the control device. Various tensions of the spring 96 may be acquired by operating and adjusting the screw 100.

Movement of the control device in the direction indicated by the arrow 134 tends to place the spring 96 under greater tension due to the fact that the pin 126 engages the lateral extension 116 and swings the movable element 110 upon the pintle rod 86. This, of course, causes the entire bracket 88 to likewise be swung upon the pintle rod 86 and places the spring 96 under greater tension.

The movement just referred to likewise swings the entire thermostatic member together with the armature arm carried thereby away from the fixed electric contacts.

It will be noted that the device can be set for operation at different temperatures by swinging movement of the control arm 118. Movement of the arm 118 affects the position of the thermostatic bar and the armature carried thereby relative to the electrical stationary contacts.

The device can be initially adjusted at the factory for securing proper operation thereof by varying the position of the thermostatic bar relative to the movable element 110, this being accomplished by use of the adjusting screw 100.

After the device is initially set, then any temporary adjustment depending upon the temperature desired in the room can be accomplished by swinging the control device in either direction.

As shown in the drawings, the device is so arranged that when the control arm 118 is in vertical position, the operation of the device will take place at a seventy degree temperature.

It will be noted that I have provided a very practical mounting for the thermostatic bar and one that enables the parts to be quickly and readily assembled as well as properly adjusted for accurate operation.

Some changes may be made in the arrangement and construction of the various parts of my room thermostat without departing from the real spirit and purpose of my invention, and it is my intention to cover by my claims, any modified forms of structure or use of mechanical equivalents, which may be reasonably included within their scope.

I claim as my invention:

1. In a room thermostat, a movable contact carrying arm, a fixed contact, a thermostatic metal bar pivotally mounted and having said arm connected thereto, a control device for imparting rotary movement to said thermostatic metal bar, and a spring for resisting said control device and for holding the bar and control device in engagement.

2. In a room thermostat operable for opening and closing an electric circuit, comprising a base, a thermostatic bar pivotally mounted on said base, a control device for imparting slight rotary movement to said bar, said bar being independent of said device and not directly connected thereto, and a spring for retaining said bar in contacting relationship to said control device.

3. A room thermostat of the class described, operable for making and breaking an electric circuit, comprising a spirally arranged thermostatic bar, a pivotal mounting therefor, including means for receiving one end of said bar, spring means constrained to move said mounting in one direction of rotation, and a control device operable for imparting movement to said mounting against the action of said spring means, and for serving as a limit to the movement caused by said spring means.

4. A room thermostat of the class described, operable for making and breaking an electric circuit, comprising a spirally arranged thermostatic bar, a pivotal mounting therefor, including means for receiving one end of said bar, spring means constrained to move said mounting in one direction of rotation, and a control device operable for imparting movement to said mounting against the action of said spring means, and an initial adjusting mechanism interposed between said mounting and said control device.

5. A room thermostat of the class described, operable for making and breaking an electric circuit, comprising a thermostatic bar, a mounting therefor capable of slight rotary movement, said mounting including a bracket having a pair of arms, a pintle rod carried by said arms, a receiving member for one end of said bar, an extension on said last member, a spring connecting said extension to said bracket, and a control device operable for moving parts of said mounting against the action of said spring.

6. In a room thermostat operable for opening and closing an electric circuit, comprising a base, a thermostatic bar pivotally mounted on said base, a control device for imparting slight rotary movement to said bar, said control device including an arm pivotally mounted, a pin carried by said arm, a member in engagement with said pin for transmitting movement of the arm to the thermostatic bar.

7. In a room thermostat operable for opening and closing an electric circuit, comprising a base, a thermostatic bar pivotally mounted on said base, a control device for imparting slight rotary movement to said bar, said control device including an arm pivotally mounted, a pin carried by said arm, a member in engagement with said pin for transmitting movement of the arm to the thermostatic bar, and a spring for yieldingly holding said member in engagement with said pin.

8. In a room thermostat operable for opening and closing an electric circuit, comprising a base, a thermostatic bar pivotally mounted on said base, a control device for imparting slight rotary movement to said bar, said control device including an arm pivotally mounted, a pin carried by said arm, a member in engagement with said pin for transmitting movement of the arm to the thermostatic bar, a spring for yieldingly holding said member in engagement with said pin, and means for adjusting the tension of said spring irrespective of the position of said control device.

9. In a room thermostat operable for opening and closing an electric circuit comprising a base, a thermostatic bar pivotally mounted on said base, a control device for imparting slight rotary movement to said bar, said bar being independent of said device and not directly connected thereto, a spring for retaining said bar in contacting relationship to said control device, and means for adjusting the tension of said spring irrespective of the position of said control device.

ALBERT PENN.